PREPARATION OF PURE BERYLLIUM HYDRIDE

Reinhold H. Kratzer and Kazimiera J. L. Paciorek, Costa Mesa, Calif., assignors to the United States of America as represented by the Secretary of the Navy
No Drawing. Filed Nov. 30, 1965, Ser. No. 511,024
Int. Cl. C01f 3/00
U.S. Cl. 423—645    2 Claims The invention herein described may be manufactured and used by or for the Government of the United States of America for governmental purposes without the payment of any royalties thereon or therefor.

The present invention relates to a procedure for the preparation of pure beryllium hydride of composition $BeH_2$, in a quantitative yield. This pure beryllium hydride can be utilized as a solid high energy propellant and in solid propellant formulations.

Prior known procedures for the preparation of $BeH_2$, afforded materials of much lower purity than the instant invention. The reactions of $BeCl_2$ with LiH and of dialkylberyllium with $LiAlH_4$ yield a product from which ether cannot be removed completely, whereas the pyrolysis of di-tert-butylberyllium gives a product contaminated with unremovable hydrocarbon residues. The purity of the beryllium hydride obtained in the prior art pyrolysis procedure is 96.3 mole percent and 60 weight percent respectively. $BeH_2$ rich material was prepared by Burg & Schlesinger utilizing $Me_3N$ as $BH_3$-group extracting agent. It has also been broadly suggested by Dr. Peter J. Slota, Jr. that organophosphines can be used as $BH_3$-extracting agents for the preparation of $BeH_2$ from $Be(BH_4)_2$. However, the first actual reaction using an organophosphine was in the instant invention where the etherate of beryllium borohydride was reacted with triphenylphosphine with the intention to replace the ether molecule with triphenylphosphine and prepare a solid mono-Lewis base adduct of beryllium borohydride.

In the present invention pure beryllium hydride, $BeH_2$, is prepared by the reaction of beryllium borohydride etherate, $Be(BH_4)_2Et_2O$, with triphenylphosphine, $(C_6H_5)_3P$ Beryllium hydride, $BeH_2$, is freed from the by-product triphenylphosphino-borine, $(C_6H_5)_3PBH_3$ by extraction with benzene. The beryllium hydride prepared by this procedure, according to the hydrogen analyis, is 99 weight percent pure.

It is an object of the invention to provide a new and improved procedure for producing pure beryllium hydride, $BeH_2$.

Another object of the invention is to provide a procedure for producing beryllium hydride, $BeH_2$, in quantitative yield, in greater purity than heretofore attained.

A further object of the invention is to provide a method for the synthesis of pure beryllium hydride as a solid high energy propellant.

Other objects and many of the attendant advantages of this invention will become readily appreciated as the same becomes better understood by reference to the following detailed description.

A typical preparation and purification of $BeH_2$ is described in detail by the following example: Resublimed triphenylphosphine (1792.5 mg., 6.8338 mmoles) was placed in an ampoule equipped with two constrictions and onto it was dripped freshly distilled beryllium borohydride etherate (287.5 mg., 2.5479 mmoles). After evacuation, the ampoule was sealed and heated at 64–67° C. for 273 hr. Upon opening the ampoule to a high vacuum system 2.2743 mmoles (90%) of ether were separated from a trace of ethane (0.1003 mmole). The solid residue in the ampoule was taken into a dry box and boiled with six 20 ml. portions of benzene. The benzene insoluble material isolated in this manner (25.7 mg., 2.33 mmoles, 91% of theory) was analyzed by infrared spectroscopy both in Nujol and Kel-F oils. The only absorption exhibited by this material was a broad band centered at 5.7–5.8μ, indicating pure beryllium hydride. Acid hydrolysis yielded 18.111% of hydrogen. Calcd. for $BeH_2$:H, 18.279%. From the analysis it can be calculated that the beryllium hydride was of more than 99% (by weight) purity. From the combined benzene extracts were isolated by fractional crystallization 450 mg. (1.72 mmole) of triphenyl phosphine (M.P. 82–83° C.) and 1270 mg. (4.69 mmoles) of triphenylphosphine borine (M.P. 182–184° C. According to the following equation:

$Be(BH_4)_2 \cdot (C_2H_5)_2O + 2(C_6H_5)_3P \rightarrow$
$BeH_2 + 2(C_6H_5)_3P \cdot BH_3 + (C_2H_5)_2O$ the expected quantities of the two compounds were 1.74 mmoles of triphenylphosphine and 5.09 mmoles of triphenylphosphine-borine.

Another embodiment of the above described process is to conduct the reaction in a solvent such as benzene, heptane or other hydrocarbon solvent. Thus, the starting materials are dissolved in the given solvent and heated at 64–67° C. for a given period of time, after which period only the desired product $BeH_2$ remains as insoluble and in a form suitable for easy separation by filtration.

Obviously many modifications and variations of the present invention are possible in the light of the above teachings. It is therefore to be understood that within the scope of the appended claims the invention may be practiced otherwise than as specifically described.

What is claimed is:

1. A method for the synthesis of pure beryllium hydride of composition $BeH_2$, comprising:
   (a) adding 1 molar part beryllium borohydride etherate to 2 molar parts triphenylphosphine in a vessel,
   (b) evacuating and closing said vessel and heating same at 64–67° C. until 1 molar part of diethylether is given off in the reaction,
   (c) opening said vessel to a high vacuum system and separating the volatile byproducts from the solid residue,
   (d) extracting triphenylphosphino-borine from said residue with refluxing benzene leaving pure beryllium hydride as the insoluble product.

2. The synthesis of pure beryllium hydride as in claim 1 wherein the reaction is conducted in a hydrocarbon solvent and the insoluble product $BeH_2$ is separated by filtration.

References Cited

Wiberg: AEC-tr-1931, New Results in Preparative Hydride Research, 1954, pages 15 and 16.

Hurd: Chemistry of the Hydrides, John Wiley and Sons, Inc., New York, 1952, p. 50.

LELAND A. SEBASTIAN, Primary Examiner

U.S. Cl. X.R.
149—109; 260—606.5 N; 423—123